United States Patent [19]

Sekar

[11] Patent Number: 5,572,790
[45] Date of Patent: *Nov. 12, 1996

[54] METHOD OF MAKING A PAINT ROLLER

[76] Inventor: Chandra Sekar, 15 Jill Dr., Comack, N.Y. 11725

[*] Notice: The portion of the term of this patent subsequent to Nov. 30, 2013, has been disclaimed.

[21] Appl. No.: 447,536

[22] Filed: May 24, 1995

Related U.S. Application Data

[60] Continuation-in-part of Ser. No. 333,416, Nov. 2, 1994, which is a division of Ser. No. 159,856, Nov. 30, 1993, Pat. No. 5,398,409, which is a division of Ser. No. 971,455, Nov. 4, 1992, abandoned, which is a division of Ser. No. 897,579, Jun. 11, 1992, Pat. No. 5,195,242, which is a continuation of Ser. No. 806,809, Dec. 6, 1991, abandoned, which is a continuation of Ser. No. 660,970, Feb. 26, 1991, abandoned, which is a continuation of Ser. No. 512,795, Apr. 25, 1990, abandoned, which is a continuation-in-part of Ser. No. 394,073, Aug. 15, 1989, abandoned.

[51] Int. Cl.⁶ ..................................................... B23P 15/00
[52] U.S. Cl. ..................... 29/895.211; 29/895.21; 29/527.2; 492/17
[58] Field of Search ................. 29/895.211, 895.21, 29/895, 527.2; 156/187, 188, 189; 15/230.12, 230.13; 118/257; 492/17

[56] References Cited

U.S. PATENT DOCUMENTS

| | | |
|---|---|---|
| 2,411,842 | 12/1946 | Adams . |
| 2,789,075 | 4/1957 | Stahl . |
| 2,806,803 | 9/1957 | Thackara et al. . |
| 2,948,200 | 8/1960 | Westerbarkey . |
| 3,126,306 | 3/1964 | Sherman . |
| 3,226,799 | 1/1966 | Grodberg et al. . |
| 3,366,719 | 1/1968 | Lueders . |
| 3,429,522 | 2/1969 | Cunningham et al. . |
| 3,430,543 | 3/1969 | Gunningham et al. . |
| 3,457,130 | 7/1969 | Morrison . |
| 3,518,970 | 7/1970 | Burns et al. . |
| 3,607,492 | 9/1971 | Keith et al. . |
| 3,620,869 | 11/1971 | Stump et al. . |
| 3,700,520 | 10/1972 | Hielema . |
| 3,761,335 | 9/1973 | Cichoski et al. . |
| 4,010,054 | 3/1977 | Bradt . |
| 4,078,957 | 3/1978 | Bradt . |
| 4,192,697 | 3/1980 | Parker et al. . |
| 4,692,975 | 9/1987 | Garcia . |
| 5,137,595 | 8/1992 | Garcia . |
| 5,195,242 | 3/1993 | Sekar . |
| 5,206,968 | 5/1993 | Bower et al. . |
| 5,273,604 | 12/1993 | Garcia . |
| 5,397,414 | 3/1995 | Garcia et al. . |
| 5,398,409 | 3/1995 | Sekar . |

FOREIGN PATENT DOCUMENTS

| | | |
|---|---|---|
| 2093060 | 1/1972 | France . |
| 4007240 | 10/1990 | Germany . |
| 53-91544 | 2/1980 | Japan . |
| 2020431 | 1/1989 | Spain . |

*Primary Examiner*—Irene Cuda
*Attorney, Agent, or Firm*—Cohen, Pontani, Lieberman, Pavane

[57] ABSTRACT

A method and apparatus for making reusable paint rollers comprised of a core formed from a strip of thermoplastic material. The thermoplastic material is formed into a core by helically winding about a stationary mandril. A layer of adhesive is then applied to the outer surface of the core whereupon a cover is bonded thereto. In a first embodiment the core is formed by winding a plurality of thermoplastic strips about the mandril. In a second embodiment the core is formed by applying liquefied thermoplastic material to a driven belt which transfers the thermoplastic material to the mandril. In yet another embodiment, the paint roller is made by bonding, in a single step, a fabric cover strip to a wound strip wrapped about the mandril.

16 Claims, 5 Drawing Sheets

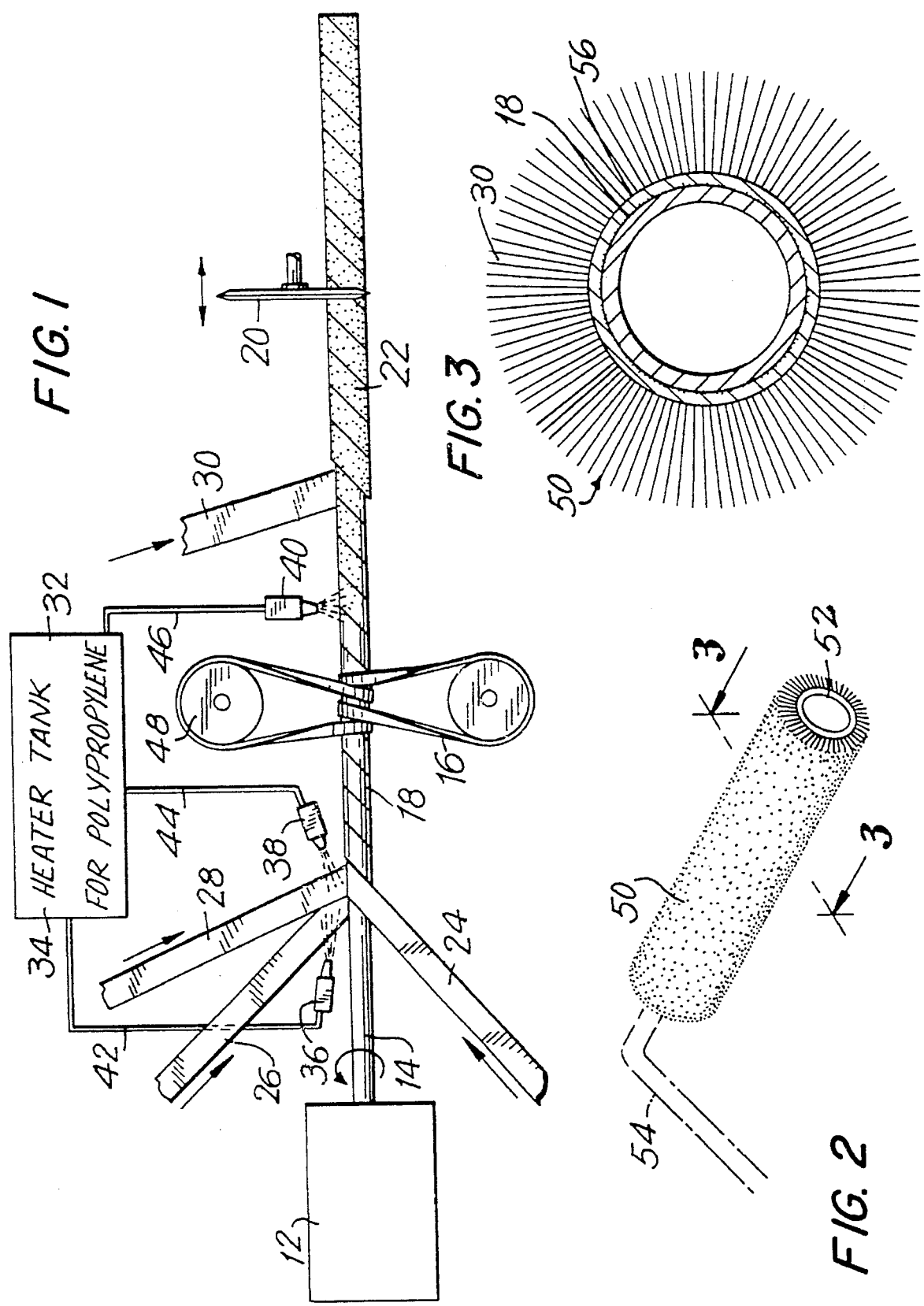

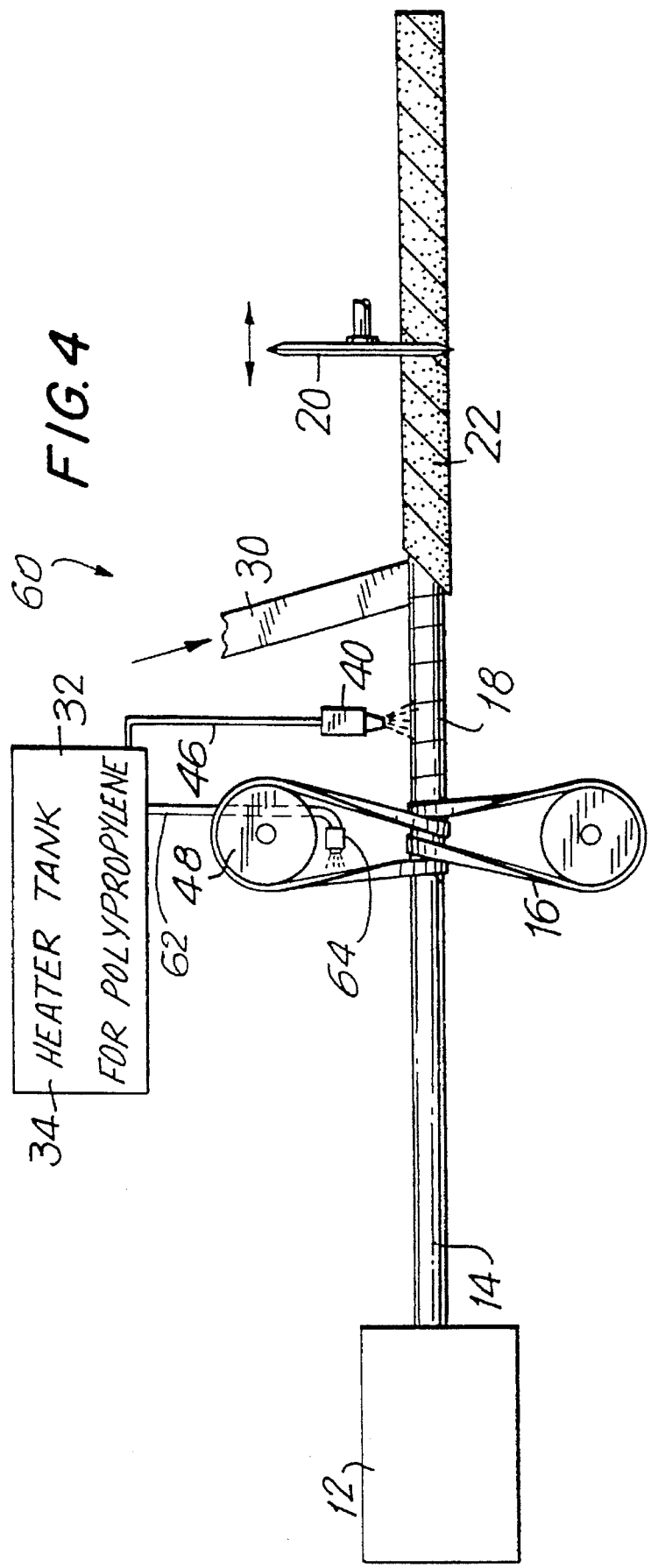

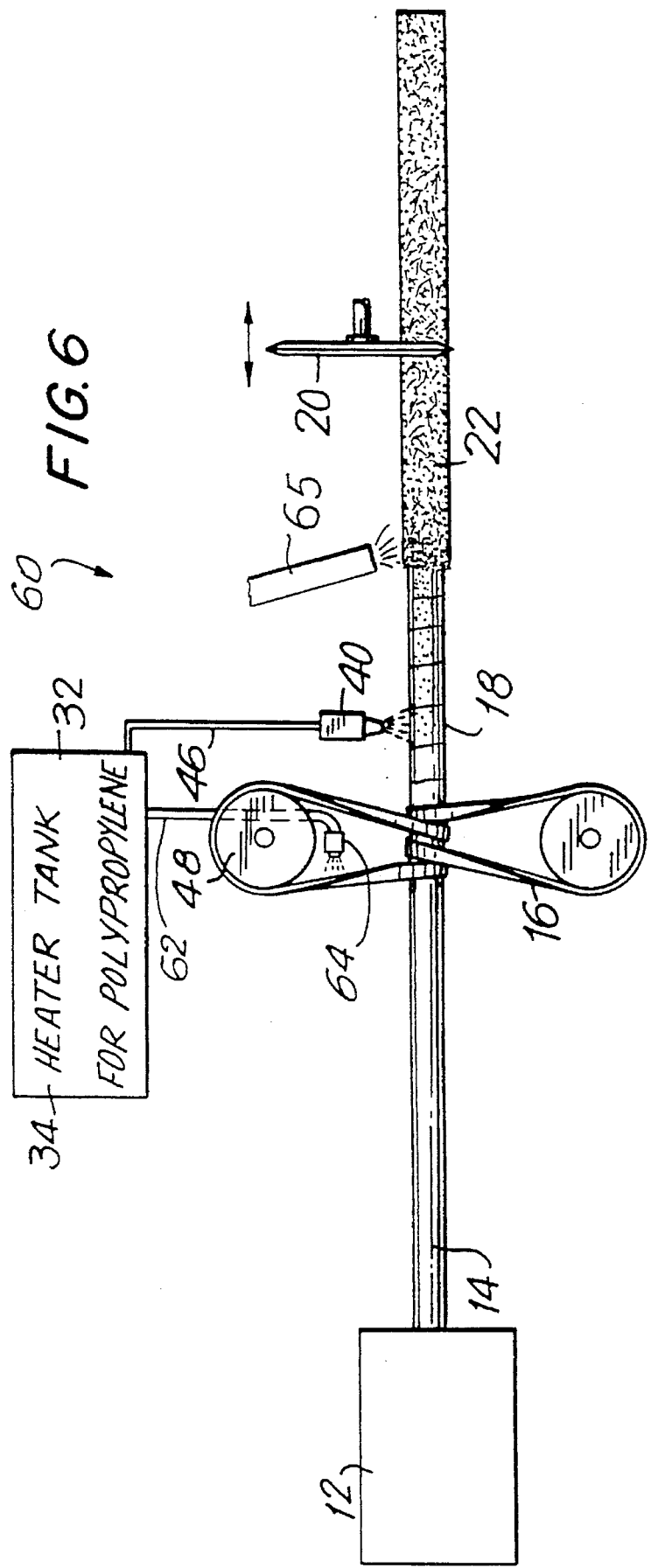

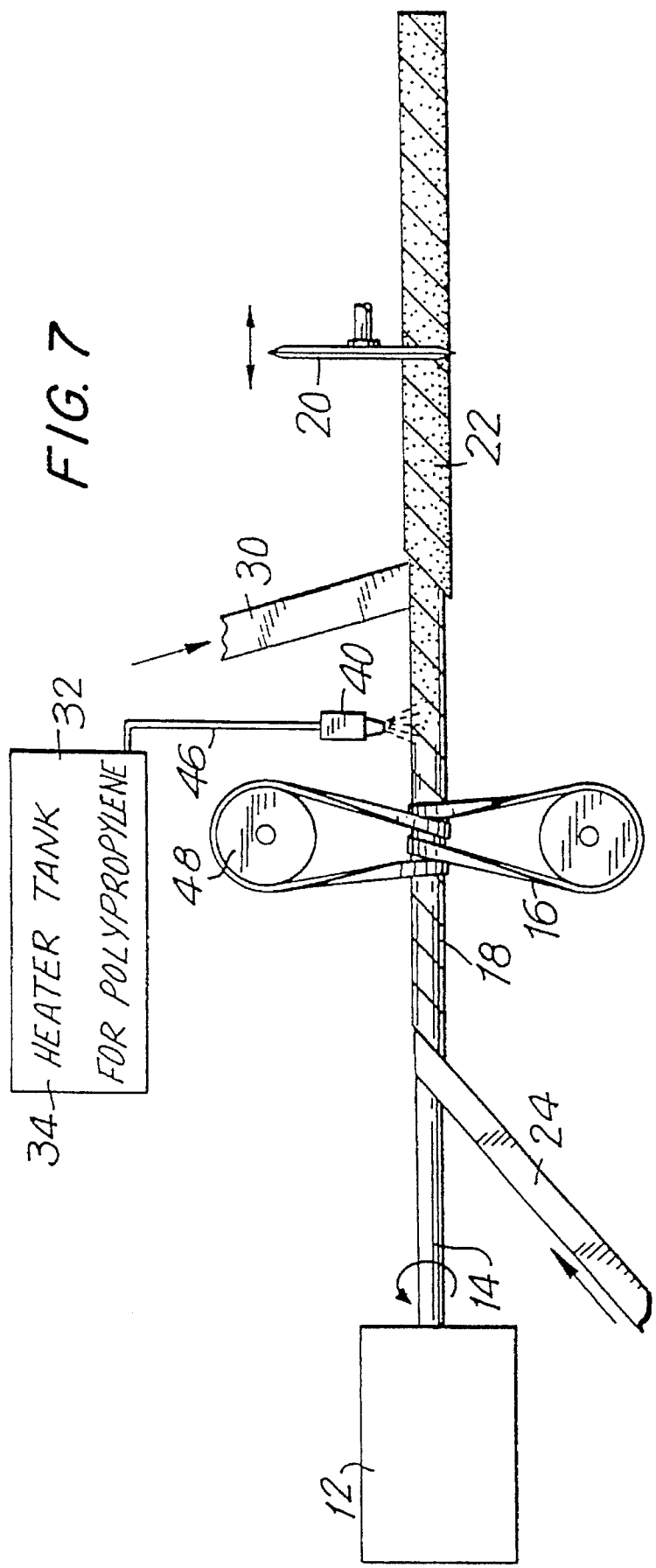

METHOD OF MAKING A PAINT ROLLER

CROSS REFERENCES TO RELATED U.S. APPLICATIONS

This is a continuation-in-part of application Ser. No. 08/333,416 filed Nov. 2, 1994, which is a division of application Ser. No. 08/159,856 filed Nov. 30, 1993 now U.S. Pat. No. 5,398,409, which is a division of application Ser. No. 07/971,455 filed Nov. 4, 1992, abandoned, which is a divisional application of Ser. No. 07/897,579 filed Jun. 11, 1992 now U.S. Pat. No. 5,195,242, which is a continuation of Ser. No. 07/806,809 filed Dec. 6, 1991, abandoned, which is a continuation of Ser. No. 07/660,970 filed Feb. 26, 1991, abandoned, which is a continuation of Ser. No. 07/512,795 filed Apr. 25, 1990, abandoned, which is a continuation-in-part of application Ser. No. 07/394,073 filed Aug. 15, 1989, abandoned.

BACKGROUND OF THE INVENTION

1. Field of the Invention

This invention pertains to a method and apparatus for making paint rollers of the type used for applying paint to walls and the like.

2. Prior Art

Paint rollers are widely used by professionals and amateurs for applying paint to walls, ceilings, and other surfaces. Typically the roller is used with an applicator having a handle terminating in a rotatable member to which the roller is secured. The roller itself comprises two main components, a core and a paint absorbing cover. The core is typically paper or plastic, while the cover may be wool, polyester, etc. Generally speaking, the methods used for forming the core and for securing the cover to the core determine whether the roller is reusable, as paint solvents such as turpentine, mineral spirits, etc. are also solvents for many adhesives.

To speed production and reduce costs, paint rollers are manufactured using an automated assembly line. For example, according to one known technique, a disposable roller is made by first feeding three chipboard paper strips at an angle to a mandril for overlapping, helical winding to form an endless, belt driven core. The paper strips are supplied in rolls for mounting on spindles for continuous feeding, and a continuous adhesive stream is applied to the outer surfaces of the strips as they feed off the rollers such that the strips adhere together as they are helically wound to form the core. Because the roller is intended as a throwaway, the adhesive is not critical, and an inexpensive adhesive, such as a water soluble white glue, is used. As the endless core is belt driven down the line, it reaches a second adhesive applicator where a continuous adhesive stream is applied to the outer surface of the core after which a continuous strip of the cover material, such as polyester, is helically wound on to the core where it is secured by the adhesive. All that remains is to cut the resulting endless roller down to usable sizes, which is usually accomplished in two steps, first using a fly away cutter to cut, e.g., 64 inch stock, and then using a recutter to cut the stock into lengths of, e.g., seven or nine inches. The rollers thus formed may not be reused, as the adhesive which binds the core and secures the cover to the core is soluble in paint solvents, and consequently any attempt to clean the roller leads to unravelling of the core and separation of the core from the cover.

If reusable rollers are desired, phenolic impregnated paper strips are substituted for the chipboard strips in the process described above, and a thermosetting glue is used for securing the core. Thereafter, the core is heated in a multi-stage infrared heater, after which a hot melt glue is applied to the core's outer surface. The rollers are then completed as before, i.e. by helically winding the fabric cover on to the core and then cutting the resulting endless roller into usable lengths. The obvious drawback of reusable cores formed in this manner is that they require a longer assembly line, due to the need of a heater, and because the phenolic must be heated to a predetermined temperature, there is an obvious trade off between the number of heater stages and the speed of the line. Moreover, while the resulting rollers are termed reusable because they do not separate when placed in paint solvents, prolonged exposure to such solvents, e.g. about two days, does result in separation.

Another reusable roller is disclosed in U.S. Pat. No. 4,692,975 issued to Garcia. Rather than using helically wound strips to form the core, the Garcia roller is formed using a core comprised of preformed thermoplastic (e.g. polypropylene) tubular stock. With the core mounted on a rotating spindle, a movable carriage mounted at an angle to the spindle feeds a continuous strip of fabric, the carriage moving parallel to the spindle in timed relation to its rotation so that the fabric strip is wound on the plastic core in a tight helix. Also mounted to the movable carriage is a heat source for heat-softening the thermoplastic core just in advance of the point where the fabric strip is applied, such that the fabric is bonded to the core as it is wound thereon. One advantage of the roller disclosed in the Garcia patent is that it is reusable, as the bond formed between cover and core is a strong one not subject to separation from exposure to paint solvents. Another advantage is that the manufacturing process does not require the application of an adhesive to bond the cover to the core. There are, however, drawbacks. For one, while prior art techniques use rolls of, e.g., chipboard or paper, the Garcia process requires preformed thermoplastic tubular cores which are considerably bulkier than rolls, more expensive to transport, and more difficult to handle. Another drawback is the anticipated speed limit of the Garcia process dictated by the necessity that the heater, which advances along the core just in front of the fabric strip, move slow enough to insure softening of the thermoplastic core, in the absence of which the fabric cover will not bond.

SUMMARY OF THE INVENTION

In accordance with a first embodiment of the present invention, paint rollers are formed from one or more strips of thermoplastic material, preferably polypropylene, wound together in overlapping relation about a stationary mandril to form a core, to which a cover is applied. The thermoplastic strips comprising the core are bonded together by a thermoplastic material, again preferably polypropylene, which is applied to the strips in liquid form, as by sufficiently heating the polypropylene in a demand melter to liquefy it, and then feeding it to the strips via feed tubes extending from the melter. The thermoplastic strips are rapidly bonded to each other to form the core as the liquid polypropylene cools and sets. After the core is formed, an adhesive, preferably additional liquid polypropylene, is applied to the outer surface of the core whereupon a fabric cover, comprised for example of polyester, is wound about the core and bonded thereto as the liquid polypropylene cools and sets. The resulting roller is reusable owing to the strength of the polypropylene bonding, which resists separation upon immersion in paint solvents, even with exposure over several days.

In accordance with a second embodiment of the present invention, liquefied thermoplastic is applied to a belt which transfers the rapid setting liquefied thermoplastic to the stationary mandril. Since the liquefied thermoplastic does not stick to the metal surface of the mandril, a coating forms about the mandril. This thermoplastic coating sets to form the core.

In accordance with yet another embodiment of the present invention, the paint rollers are formed in a manner similar to that of the first embodiment except that the step of preforming the core by applying adhesive to the helically wound thermoplastic strip or strips is eliminated. According to this embodiment, the paint roller is made by helically winding a thermoplastic strip around a mandril, applying a layer of liquified adhesive onto the outer surface of the wound strip and then helically wrapping a fabric cover about the wound strip to thereby form a paint roller. In comparison with the first embodiment, this embodiment is more efficient and less costly as it requires only a single application of liquid adhesive.

The rollers of the present invention are preferably formed using an assembly line process, which is simplified by the fact that the process for making the paint rollers of the invention uses many components common to prior art systems for making paint rollers. Furthermore, when an assembly line process is used, it is expected to be quite fast, as the polypropylene may be liquified at a location remote from the assembly line, whereby the process need not be slowed to accommodate on-line heating. Furthermore, because of the rapidity with which liquid polypropylene sets under ambient conditions, it is anticipated that the endless roller formed on the assembly line may be cut almost immediately after the fabric cover is applied, thereby allowing the assembly line to be kept quite short while still yielding a strongly bonded, reusable roller.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIG. 1 is a diagrammatic representation of an apparatus suitable for making rollers in accordance with a first embodiment of the present invention;

FIG. 2 is a perspective view of a roller made in accordance with the present invention;

FIG. 3 is a sectional view taken substantially along line 3—3 in FIG. 2;

FIG. 4 is a diagrammatic representation of an apparatus suitable for making rollers in accordance with a second embodiment of the present invention;

FIG. 6 is a diagrammatic representation of an apparatus suitable for making rollers in accordance with a fourth embodiment of the present invention; and FIG. 7 is a diagrammatic representation of an apparatus suitable for making rollers in accordance with yet another embodiment of the present invention.

DETAILED DESCRIPTION OF THE PREFERRED EMBODIMENTS

Figure 5:
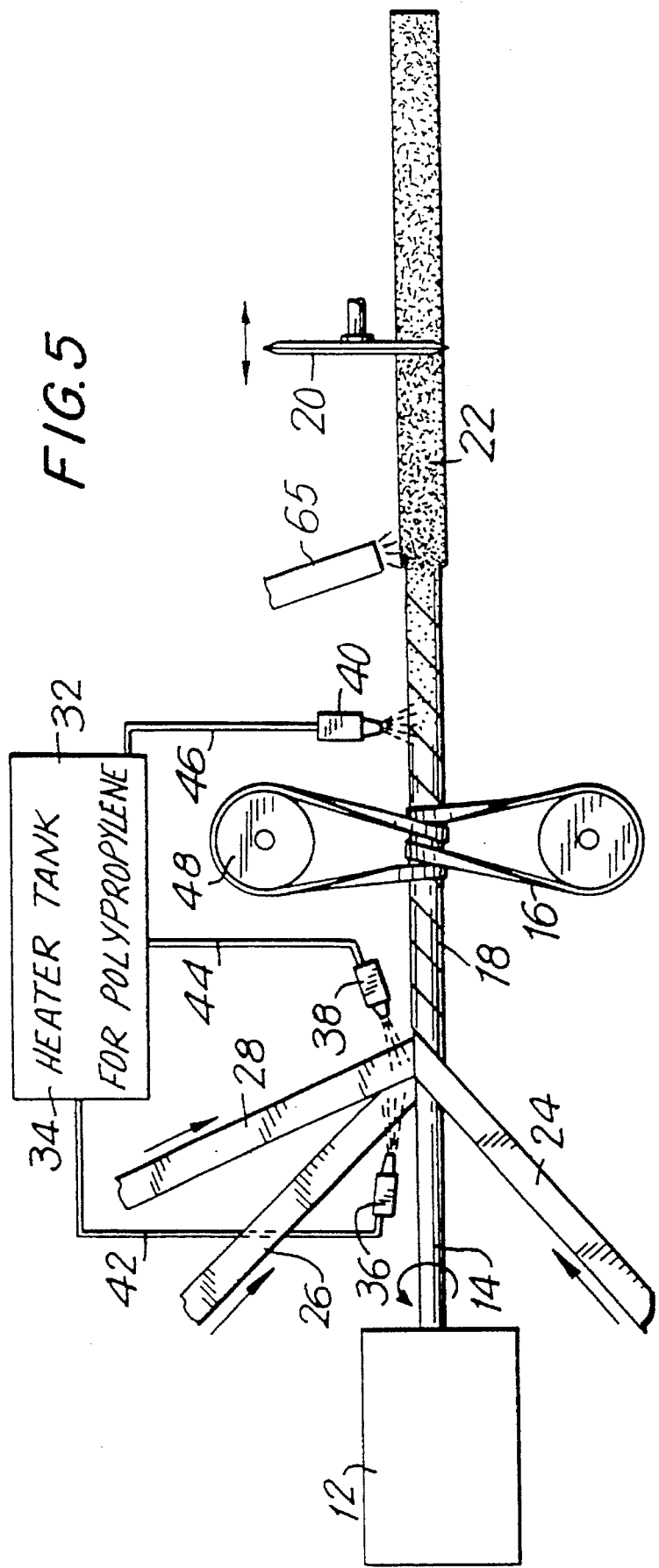
FIG. 5 is a diagrammatic representation of an apparatus suitable for making rollers in accordance with a third embodiment of the present invention.

Referring now to the drawings, and initially to FIG. 1, an apparatus suitable for making rollers in accordance with a first embodiment of the present invention is generally designated as 10. One advantage of the apparatus 10 is that it incorporates several components common to widely used prior art systems, and hence is easily retrofitted. These components include a housing 12 supporting a stationary mandril 14, a driven belt 16 wound about the formed core 18 for advancing it to the right in FIG. 1, a flyaway cutter 20 for cutting the formed endless roller 22 into usable lengths, and journaled spindles (not shown) for supporting the three rolls (also not shown) from which the strips 24, 26, 28 and 30 are drawn. Components not found in prior art systems are a demand heater 32 for maintaining a liquid supply of thermoplastic material, preferably liquid polypropylene 34, applicators 36, 38 and 40 connected by, respectively, feed tubes 42, 44 and 46 to heater 32 for applying the liquid polypropylene at predetermined points in the process, and the use of thermoplastic strips 24, 26 and 28, again preferably polypropylene, to form the core 18.

An advantage of the invention is that it employs rolls of polypropylene strips which are easy to handle and readily substituted for the rolls of chipboard and paper strips common in prior art processes. As diagrammatically illustrated in FIG. 1, and in accordance with known techniques, three polypropylene strips 24, 26 and 28 are fed at an angle to the mandril 14, two from one side and one from the other. To start the process, and as is also known in the art, the free ends of the strips 24, 26 and 28, which are typically $2^{11}/_{16}"$, $2^{3}/_{4}"$ and $2^{13}/_{16}"$ wide, are manually wound about the mandril 14 until they extend beyond the belt 6, at which point the belt is tightly wrapped about the strips and driven by activating driven wheel 48, whereupon the belt advances the formed core 18 to the right in FIG. 1 thereby continuously pulling fresh lengths of the polypropylene strips 24, 26 and 28 onto the stationary mandril 14. As shown, the strip 24 is fed over the mandril 14 and the strips 26, 28 are fed under the mandril such that all three strips are advanced to the right in FIG. 1 by the rotation of the belt 16, and preferably the strips 24, 26 and 28 are wound in tight helical paths.

Still referring to FIG. 1, the applicators 36, 38 apply liquid polypropylene from the demand melter 32 to the outer surfaces of the strips 26, 28 just before they are wound on the mandril 14. The demand melter is set to maintain its interior at a temperature sufficiently high to insure that the polypropylene therein is in liquid form. As the strips 24, 26 and 28 are wound onto the mandril in overlapping fashion by the advancing action of the belt 16, the liquid polypropylene is disposed between the overlapping strips, and because the strips are also comprised of polypropylene, the overlapping strips are rapidly bonded to each other as the liquid polypropylene cools and sets, thereby forming an integral endless core 18.

Next, additional liquid polypropylene is applied onto the outer surface of the core 18 by the applicator 40 which is situated just to the right of the belt 16 in FIG. 1. Immediately thereafter, the fabric cover 30, which may comprise any of the conventional materials now in use, such as polyester, is wound onto the core 18, whereupon it is rapidly bonded to the core 18 as liquid polypropylene cools and sets. Again, because the core is also formed of polypropylene, the strong bond is formed between the core 18 and the fabric cover 30. It will be appreciated that in accordance with known techniques, winding of the fabric cover 30 onto the core 18 is started manually, just like the strips 24, 26 and 28, and that fresh lengths of the fabric strip 30 are then continuously pulled onto the core 18 by the advancement of the core 18 to the right as effected by the belt 16. Again, the cover strip 30 is preferably wound in a tight helical path about the core.

At this point, all that remains is to cut the now formed endless roller 22 into usable lengths. Because the polypropylene bonds which secure the core 18 and hold the fabric cover 30 to the core set rapidly with the cooling of the liquid polypropylene, it is anticipated that the flyaway cutter for cutting the endless roller 22 may be positioned quite close to the ontake of the fabric cover 30. The actual position of the flyaway cutter 20 can, of course, be adjusted as necessary to insure that the cutting operation is not effected before the bonds set. As is common, the flyaway cutter may be adjusted to cut the endless roller 22 into 64" stock, which may then be recut to the usual 7" and 9" sizes.

A finished roller 50 in accordance with the invention is shown in FIG. 2, and in cross-section in FIG. 3. The roller 50 may be used in the same manner as prior art rollers, namely, as a replacement element or, with the addition of end pieces 52 and a handle 54, as part of a complete roller assembly. In FIG. 3, 56 represents the polypropylene bond joining the fabric cover 30 to the core 18. Because polypropylene bonds are not soluble in paint solvents, the rollers 50 produced in accordance with the invention are reusable. Indeed, because the core 18 itself comprises polypropylene, the roller 50 defines a substantially integral assembly, and it is expected that separation of the fabric 30 from the core 18 will not occur even if the roller is exposed to a paint solvent over a period of several days.

Referring now to FIG. 4 a second embodiment of an apparatus in accordance with the present invention is generally designated at 60. As shown, strips 24, 26 and 28, feed tubes 42, 44 and applicators 36, 38 of the apparatus 10 of FIG. 1 have all been eliminated from apparatus 60. A feed tube 62 and an applicator 64 feed liquefied polypropylene 34 from heater tank 32 for application to driven belt 16. The driven belt 16 is formed of a material such as rubber or teflon compound to which liquid polypropylene 34 does not adhere. Driven belt 16 is tightly wrapped around mandril 14 such that the liquid polypropylene 34 applied to belt 16 is transferred to mandril 14 by driven belt 16. Mandril 14 is preferably composed of a suitable metal. When transferred to mandril 14 the liquid polypropylene 34 forms a coating thereabout, but does not adhere to the stationary mandril, which is formed of metal. The coating is applied evenly about the mandril as the belt 16 rotates thereabout. The coating sets rapidly to form a core 18 which is then continuously advanced to the right by the rotational motion of the belt 16. Applicator 40, located preferably 12–18 inches from driven belt 16, applies liquid polypropylene to core 18 in the same manner and for the same purpose as in the apparatus 10 of FIG. 1.

Apart from the advantage of producing extremely well bonded, reusable rollers, the invention provides several manufacturing advantages. For one, because of the rapidity with which the polypropylene bonds set, the assembly line can be kept quite short, with the flyaway cutter, the final component on the line, positioned close to the ontake of fabric strip 30. Also, because the polypropylene is preheated to a liquid state in the heater 32, which may be remotely located, there is no need for a heating element in proximity to the assembly line, and consequently the line need not be slowed to accommodate on-line heating. Therefore, it is anticipated that the line can be run quite fast, thereby increasing production and reducing unit cost. Another advantage, noted above, is that the method of the invention forms the core and cover from strips, just like the prior art methods, and therefore is easily retrofitted to existing systems using several of their components which, of course, is less expensive than a new installation. Also, as compared with those prior art systems which utilize prefabricated tubular stock for the roller core, the present invention's reliance on polypropylene strips is superior, as strips, which come in rolls, are less bulky and easier to handle. Their lesser bulk also reduces transportation costs.

As shown in FIGS. 5 and 6, in place of fabric cover 30, a flocking head 65 may be used to apply a suitable cover material, such as blown-on fibers, to core 18.

With reference now to FIG. 7, and in accordance with yet another embodiment of the present invention, the step of applying adhesive to the strip or strips 24 prior to the step of winding the strip 24 about the mandril 14 is eliminated. Rather, the adhesive is applied only after the step 24 is wound on the mandril 14 and before the step of wrapping the fabric cover strip 30 onto the wound strip 24.

In accordance with the embodiment of FIG. 7, preferably a single strip 24 is helically wound about the stationary mandril 14. The wound strip 24 is then advanced along the longitudinal axis of the mandril 14 by the traction force applied by the belt 16. Preferably, the strip 24 is helically wound or wrapped about the mandril 14 with successive turns in a closely-spaced manner, though it is also contemplated that adjacent edges may be abutting or overlapping. Preferably, the strip 24 is made of a thermoplastic material such as, for example, polypropylene.

The wound strip 24 is advanced along the longitudinal axis of the mandril 14 to a position, preferably downstream from the driven belt 16, where a fabric cover strip 30 is applied. Prior to the application of the fabric cover strip 30, the applicator 40 applies a layer of adhesive such as, for example, a liquid thermoplastic material, to the outer surface of the wound strip 24. The liquid thermoplastic material is preferably polypropylene.

The roller 22 is then formed by helically winding or wrapping the fabric strip 30 over the adhesive layer and about the outer surface of the wound strip 24 with sufficient tensile force so that the fabric cover 30 lays smoothly over the adhesive layer. Preferably, the adhesive layer is of uniform thickness.

After the adhesive or liquid polypropylene cools and sets, which is extremely fast in the case of liquid polypropylene, the roller 22 may be cut into desirable lengths by a cutting device such as, for example, a flyaway cutter disposed proximate thereto. The paint roller 50 formed in accordance with this embodiment is an integral roller having the same advantageous characteristics attributable to rollers manufactured according to the other embodiments described herein.

Therefore, in accordance with the embodiment of FIG. 7, the entire roller 22 is formed in a single step as the fabric cover 30 is wrapped about the wound strip 24. That is, there is no need to provide a formed core and then wrap the fabric about the formed core. Rather, the entire roller 22 including the core is fabricated in a single step as the fabric is wound about the adhesively coated wound strip 24.

In a particular example of construction in accordance with the embodiment of FIG. 7, the roller 22 comprises a wound polypropylene strip 24 having a thickness in the range of about 0.020 inch to 0.030 inch; an adhesive layer of polypropylene having a thickness in the range of about 0.005 inch to 0.010 inch; and a fabric cover 30 made of polyester having any suitable thickness.

Advantageously, the apparatus according to this embodiment requires only one applicator 40 and one feed tube 46. Therefore, feed tubes 42, 44 and applicators 36 and 38 used in the embodiment of FIG. 1 are eliminated.

While the foregoing describes and illustrates the preferred embodiment of the present invention and suggests certain modifications thereto, those of ordinary skill in the art will recognize that still further changes and modifications may be made therein without departing from the spirit and scope of the invention. Accordingly, the above description should be construed as illustrative and not in a limiting sense, the scope of the invention being defined by the following claims.

I claim:

1. A method of making a paint roller, comprising the steps of:

helically winding a strip of thermoplastic material around a mandril so as to form a helically wound strip;

advancing the wound strip along the mandril;

applying a layer of adhesive onto an outer surface of the wound strip; and helically wrapping a strip of cover material about the wound strip and over the layer of adhesive, thereby bonding the strip of cover material to the wound strip for forming the paint roller.

2. The method of claim 1, wherein the adhesive comprises a liquid thermoplastic material.

3. The method of claim 2, wherein the liquid thermoplastic material comprises polyproplylene.

4. The method of claim 1, wherein the thermoplastic material and the adhesive comprise polypropylene.

5. The method of claim 1, wherein the cover material comprises a fabric.

6. The method of claim 5, wherein the fabric comprises polyester.

7. The method of claim 5, wherein the thermoplastic material and the adhesive comprise polypropylene.

8. The method of claim 1, wherein a plurality of strips are wound around the mandril in said winding step.

9. A method of making a paint roller, comprising the steps of:

continuously forming around a mandril an endless core comprised of a strip of thermoplastic material;

applying a cover about said core, said cover being comprised of a material compatible with said thermoplastic material so that said cover material is capable of fixedly adhering to the core;

treating at least one of the core and the cover so that the cover is thermoplastically bonded to said core.

10. The method of claim 9, wherein the thermoplastic material comprises polypropylene.

11. The method of claim 9, wherein the step of applying a cover comprises winding a cover strip about the core.

12. The method of claim 9, wherein the step of applying a cover comprises blowing fibers onto the core.

13. The method of claim 9, wherein the cover comprises a fabric.

14. The method of claim 13, wherein the fabric comprises polyester.

15. The method of claim 9, further comprising cutting the endless covered core into usable lengths.

16. The method of claim 9, wherein a plurality of strips are used in said forming step.

* * * * *